United States Patent
Wilkin (10) Patent No.: US 10,006,516 B2
(45) Date of Patent: Jun. 26, 2018

(54) SHOCK ABSORBERS HAVING A COMPOSITE BASE ASSEMBLY WITH AXIAL FLEXIBILITY COMPENSATION

(71) Applicant: Tenneco Automotive Operating Company Inc., Lake Forest, IL (US)

(72) Inventor: Julien Wilkin, Fraiture (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 30 days.

(21) Appl. No.: 14/952,047

(22) Filed: Nov. 25, 2015

(65) Prior Publication Data
US 2016/0146285 A1     May 26, 2016

Related U.S. Application Data

(60) Provisional application No. 62/084,771, filed on Nov. 26, 2014.

(51) Int. Cl.
  *F16F 9/32* (2006.01)
  *F16F 9/18* (2006.01)
(52) U.S. Cl.
  CPC ........... *F16F 9/3242* (2013.01); *F16F 9/185* (2013.01)
(58) Field of Classification Search
  CPC ......... F16F 9/3242; F16F 9/3235; F16F 9/062
  See application file for complete search history.

(56) References Cited

U.S. PATENT DOCUMENTS

| 2,107,974 | A | * | 2/1938 | Carrouee | ............... F16F 9/185 |
| | | | | | 188/318 |
| 4,441,593 | A | | 4/1984 | Axthammer | |
| 4,589,528 | A | | 5/1986 | Axthammer et al. | |
| 5,441,132 | A | | 8/1995 | Pradel et al. | |

(Continued)

FOREIGN PATENT DOCUMENTS

| EP | 2657565 A1 | 10/2013 |
| JP | H07-054986 | 2/1995 |
| JP | H11-244085 | 9/1999 |
| WO | 2005030506 A2 | 4/2005 |

OTHER PUBLICATIONS

International Search Report for Application No. PCT/US2015/062669 dated Feb. 15, 2016, 3 pages.

(Continued)

*Primary Examiner* — Bradley T King
(74) *Attorney, Agent, or Firm* — Howard & Howard Attorneys PLLC (57) ABSTRACT

A shock absorber including an inner assembly and a composite base assembly is disclosed. The inner assembly includes a pressure tube extending between first and second ends, a rod guide disposed adjacent to the first end, a compression valve disposed adjacent to the second end, a piston assembly disposed in the pressure tube between the rod guide and the compression valve, and a rod operatively attached to the piston assembly and supported by the rod guide. The composite base assembly defines a chamber for at least partially accommodating the inner assembly that terminates at a floor. The composite base assembly has a lower element disposed adjacent to the floor for at least partially engaging the second end of the pressure tube. The lower element defines at least one gap for facilitating fluid communication between the pressure tube and the chamber.

8 Claims, 7 Drawing Sheets

(56) References Cited

U.S. PATENT DOCUMENTS

| | | | |
|---|---|---|---|
| 5,651,303 A * | 7/1997 | Fish | F15B 15/1438 29/453 |
| 5,727,662 A | 3/1998 | Guy et al. | |
| 8,434,772 B2 | 5/2013 | Keil et al. | |
| 2002/0063024 A1 | 5/2002 | Ashiba et al. | |
| 2005/0034941 A1 | 2/2005 | Tsukamoto et al. | |
| 2005/0067237 A1 * | 3/2005 | Schurmans | F16F 9/062 188/276 |
| 2007/0120300 A1 * | 5/2007 | Achenbach | B62K 25/04 267/64.17 |
| 2009/0026030 A1 | 1/2009 | de Molina et al. | |
| 2009/0057079 A1 * | 3/2009 | Vanbrabant | F16F 9/3488 188/313 |
| 2011/0056785 A1 * | 3/2011 | Marquar | B60G 15/07 188/322.19 |
| 2013/0276625 A1 * | 10/2013 | Schuler | F16F 9/3242 92/172 |
| 2016/0129746 A1 * | 5/2016 | Eifflaender | F16F 9/3242 188/316 |
| 2016/0229247 A1 * | 8/2016 | Kuroda | B60G 7/001 |

OTHER PUBLICATIONS

English language abstract and machine-assisted English translation for EP2657565A1 extracted from espacenet.com database on May 16, 2016, 8 pages.

English language abstract and machine-assisted English translation for JPH07-054896 extracted from the JPO database on Feb. 26, 2016, 10 pages.

English language abstract and machine-assisted English translation for JPH11-244085 extracted from the JPO database on Feb. 26, 2016, 12 pages.

* cited by examiner

SHOCK ABSORBERS HAVING A COMPOSITE BASE ASSEMBLY WITH AXIAL FLEXIBILITY COMPENSATION

CROSS REFERENCE TO RELATED APPLICATION

This application claims the benefit of U.S. Provisional Patent Application Ser. No. 62/084,771 filed Nov. 26, 2014, the contents of which is incorporated in its entirety by reference.

BACKGROUND OF THE INVENTION

1. Field of the Invention

The present invention relates generally to shock absorbers, and more specifically, to shock absorbers having a composite base assembly with axial flexibility compensation.

2. Description of the Related Art

Conventional shock absorbers known in the related art typically include an outer tube, a piston assembly, a rod, fluid, and one or more valves, whereby the piston assembly is connected to the rod and travels within fluid in the outer tube in operation so as to dampen axial movement of the rod with respect to the outer tube. To that end, respective opposing ends of the rod and outer tube are attached to different members or structures so as to dampen movement therebetween. By way of example, conventional automotive suspension systems utilize shock absorbers in connection with springs to control the suspension damping in compression and rebound, whereby the shock absorber is typically attached to a knuckle supporting a wheel at one end, and to a portion of the vehicle's frame or body at the other end.

Depending on the application, the shock absorber may also include an inner tube disposed inside the outer tube, wherein the piston assembly is instead supported in the inner tube. The inner tube defines a working chamber filled with fluid through which the piston assembly can move in operation. Similarly, a reservoir chamber is defined in the space between the outer tube and the inner tube. The reservoir chamber also contains fluid and is in regulated fluid communication with the working chamber via one or more valves. The outer tube is typically manufactured from steel and, consequently, can be heavy. In an effort to reduce the weight of the outer tube, thin-walled steel may be used. However, it will be appreciated that reducing the wall thickness of the outer tube correspondingly reduces the strength, thereby making the shock absorber sensitive to externally applied forces and damage in operation.

Recently, composites have increasingly been used in automotive applications to reduce weight while maintaining the strength. Thus, given the drawbacks of outer tubes manufactured from steel discussed above, it is desirable to manufacture the outer tube from a composite material. However, it will be appreciated that composites have significantly different material properties than those of metals. Particularly, composite materials have a lower stiffness and therefore have greater elongation than metals.

Typically, shock absorbers are assembled with an internal preload between the inner tube and the outer tube, so as to prevent the various components discussed above from coming lose in operation, and to help keep the piston assembly, rod, inner tube, and outer tube aligned in operation. Proper alignment ensures reduced friction and low noise in operation. Thus, it will be appreciated that axial rebound loading of the shock absorber may cause a composite outer tube to deform significantly, such that the preload discussed above would disappear and the various components could come loose, leading to increased noise and friction as well as decreased performance and component life.

Each of the components of a shock absorber of the type described above must cooperate to effectively dampen axial movement in operation. While shock absorbers known in the related art have generally performed well for their intended purpose, there remains a need in the art for a shock absorber that has similar operational characteristics, performs reliably, and provides advantages relating to decreased weight.

SUMMARY OF THE INVENTION

The shock absorber of the present invention includes an inner assembly and a composite base assembly. The inner assembly includes a pressure tube extending between first and second ends, a rod guide disposed adjacent to the first end of the pressure tube, a compression valve disposed adjacent to the second end of the pressure tube, a piston assembly disposed in the pressure tube between the rod guide and the compression valve, and a rod operatively attached to the piston assembly and supported by the rod guide so as to concentrically align the rod with the pressure tube. The composite base assembly defines a chamber for at least partially accommodating the inner assembly therein. The chamber terminates at a floor. The composite base assembly has a lower element disposed adjacent to the floor for at least partially engaging the second end of the pressure tube of the inner assembly to trap said second end and restrict lateral movement thereof, while permitting longitudinal movement. The lower element defines at least one gap for facilitating fluid communication between the pressure tube and the chamber.

The present invention overcomes the disadvantages in the related art in a shock absorber. In this way, the shock absorber of the present invention effectively dampens axial movement and, at the same time, compensates for axial flexibility differences between the inner assembly and the composite base assembly in operation, while maintaining alignment between the pressure tube and the composite base assembly. In addition, the shock absorber of the present invention provides significant advantages relating to decreased weight.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
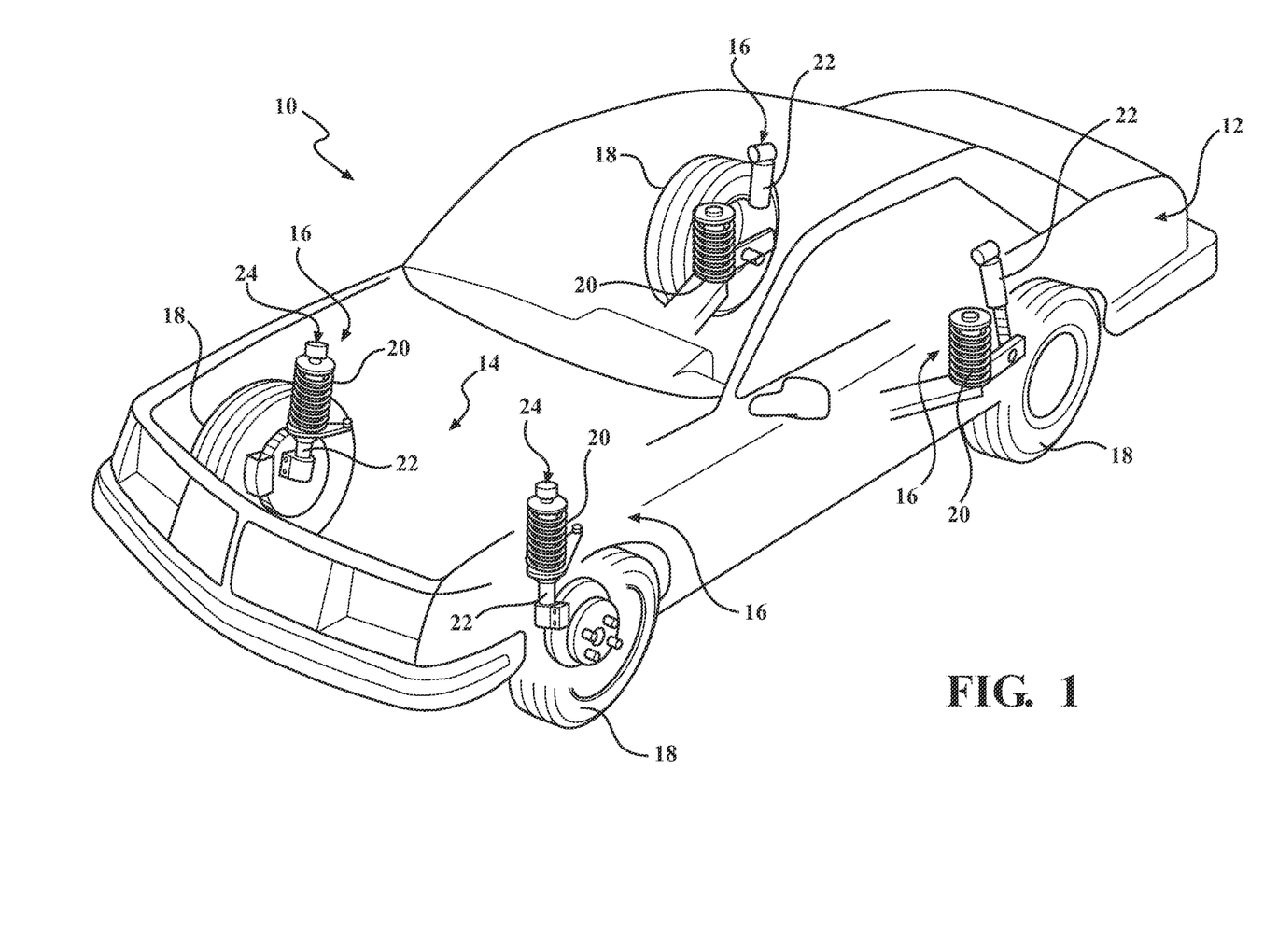
FIG. 1 is an enlarged perspective view of a generic vehicle showing a conventional suspension system.

With reference to the Figures, where like numerals are used to designate like structure throughout the several views, a portion of a conventional vehicle is illustrated at 10 in FIG. 1. The vehicle 10 includes a body 12 operatively attached to a suspension system 14 defined by four corner assemblies 16. The corner assemblies 16 are each assigned to a rotatably supported wheel 18 and are used to control the relative motion between the body 12 and wheels 18 in operation. To that end, the corner assemblies 16 each typically include a spring 20 to help absorb impacts, and a shock absorber 22 to help control motion of the spring 20 by damping movement between the wheel 18 and vehicle body 12.

As shown in FIG. 1, the springs 20 are compression springs and can be either concentrically aligned around the shock absorber 22, or spaced from the shock absorber 22. Thus, those having ordinary skill in the art will appreciate that the shock absorber 22 of the present invention can be used in connection with any suitable type of spring 20 without departing from the scope of the present invention. By way of non-limiting example, the spring 20 could be a leaf spring (not shown, but generally known in the art). Moreover, given the number of different suspension systems 14 known in the related art, it will be appreciated that any suitable number of shock absorbers 22 could be used with any suitable number of springs 20. Further, the shock absorber 22 of the present invention is not limited for use in automotive applications, and could be used in any suitable application without departing from the scope of the present invention. By way of non-limiting example, the shock absorber 22 of the present invention could be used in connection with passenger or commercial vehicles, motorcycles, all-terrain vehicles, lawn care equipment, heavy-duty trucks, trains, airplanes, ships, construction vehicles and equipment, military vehicles, or any other suitable application, suspension-based or otherwise, without departing from the scope of the present invention.

Figure 2:
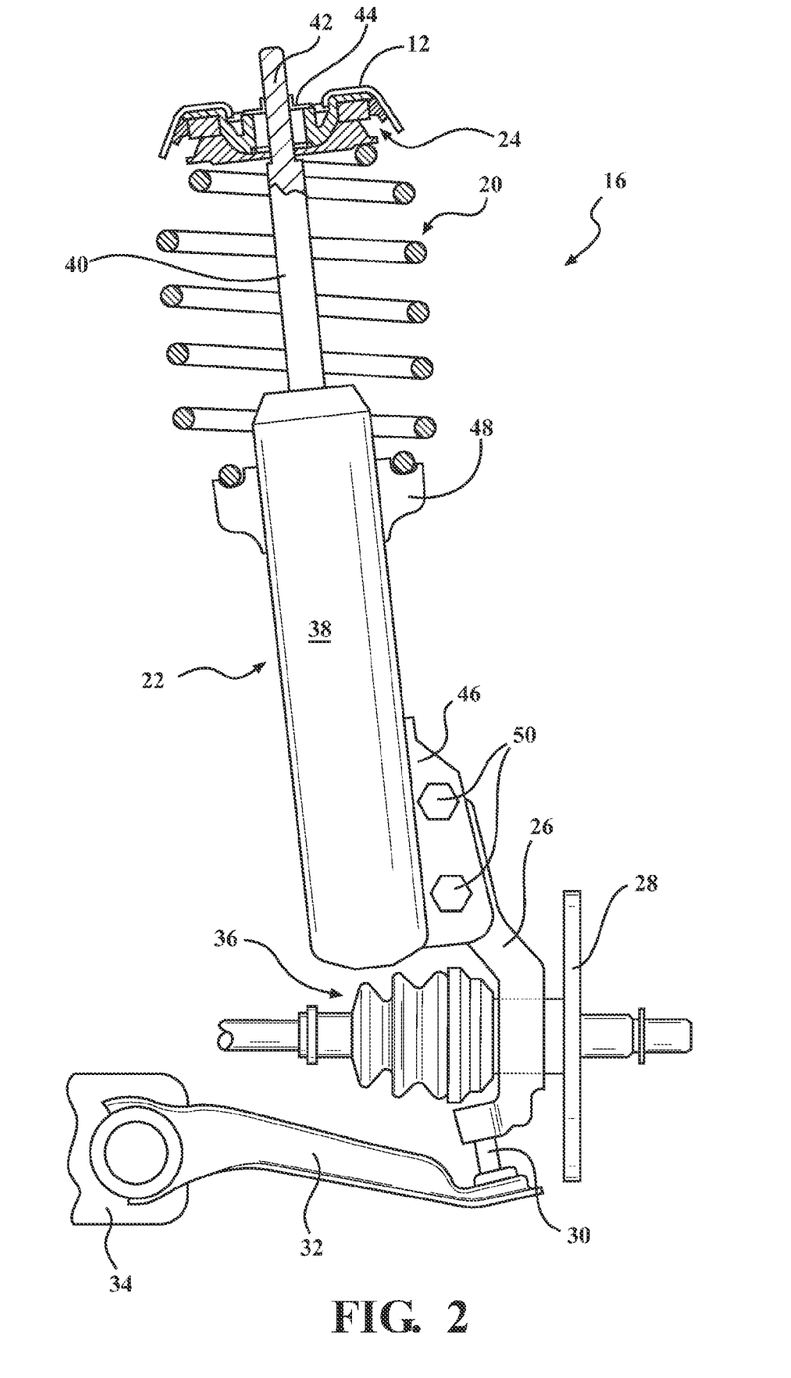
FIG. 2 is a partial sectional side view of a corner assembly of the suspension system of FIG. 1 having a conventional shock absorber.

Referring now to FIG. 2, a partial sectional view of a conventional corner assembly 16 of a vehicle suspension system 14 is shown for exemplary purposes. Those having ordinary skill in the art will recognize the corner assembly 16 depicted in FIG. 2 as a MacPherson strut system, which includes a strut-type shock absorber 22 used to control movement between the vehicle body 12 and wheel 18 (not shown in FIG. 2). To that end, the shock absorber 22 is typically mounted between a top mount assembly, generally indicated at 24, and a knuckle 26. The top mount assembly 24 mounts to the body 12 of the vehicle 10 and helps support the spring 20, as described in greater detail below. The knuckle 26 typically includes a rotatably supported hub and bearing assembly 28, to which the wheel 18 is operatively attached. The knuckle 26 is also typically connected to a ball joint 30 mounted to a lower control arm 32 which, in turn, is pivotally supported by a frame member 34 of the vehicle. A continuously-variable joint member 36 translates rotational torque from a transmission (not shown, but generally known in the art) to the wheel 18 via the hub and bearing assembly 28. Thus, the wheel 18 can rotate in operation to drive the vehicle 10, and the suspension system 14 absorbs impacts and allows the wheel 18 to move with respect to the body 12.

The strut-type shock absorber 22 shown in FIG. 2 includes a composite base assembly 38 and a rod 40 concentrically-aligned with and supported within the composite base assembly 38 as described in greater detail below. The rod 40 typically includes a stepped and threaded end 42 adapted to secure the shock absorber 22 to the top mount assembly 24 with a nut 44. However, it will be appreciated that the shock absorber 22 could be operatively attached to the top mount assembly 24, or to any suitable portion of the vehicle 10, or to any suitable member irrespective of the application, in any suitable way, without departing from the scope of the present invention. The top mount assembly 24 allows the strut 22 and knuckle 26 to rotate such that the wheel 18 can be turned as the vehicle 10 is driven. The composite base assembly 38 shown in FIG. 2 has a mounting portion 46 adapted to attach the shock absorber 22 to the knuckle 26, and a spring seat 48 adapted to support the spring 20. While the composite base assembly 38 depicted in FIG. 2 is attached to the knuckle 26 with two bolts 50, those having ordinary skill in the art will appreciate that the composite base assembly 38 of the shock absorber 22 could be operatively attached to any suitable portion of the vehicle 10, or to any suitable member, in any suitable way, without departing from the scope of the present invention. Similarly, while the composite base assembly 38 depicted in FIG. 2 includes a spring seat 48, those having ordinary skill in the art will appreciate that the composite base assembly 38 of the shock absorber 22 could be configured to support the spring 20 in any suitable way, or not at all, without departing from the scope of the present invention.

Figure 3A:
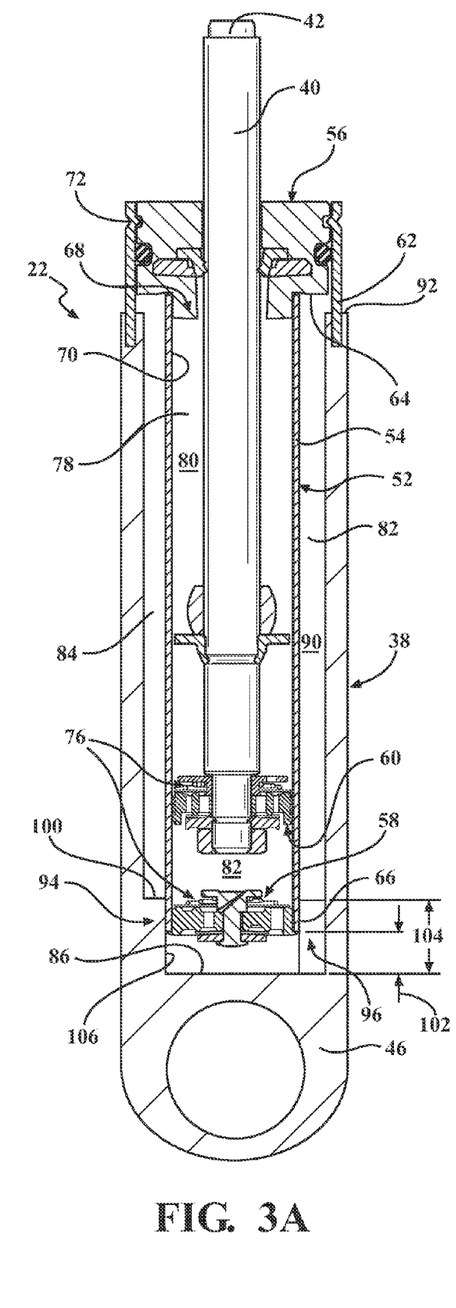
FIGS. 3A and 3B are sectional side views of shock absorbers having an inner assembly, a composite base assembly, and a closure insert, in assembled configurations, and according to another embodiment of the present invention.
Figure 3B:
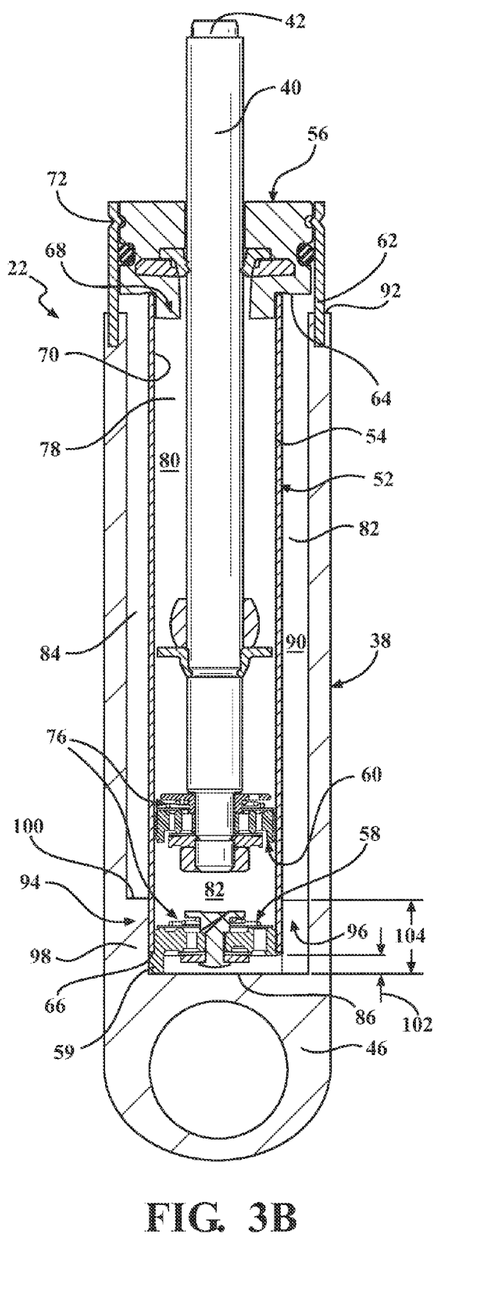
Figure 4:
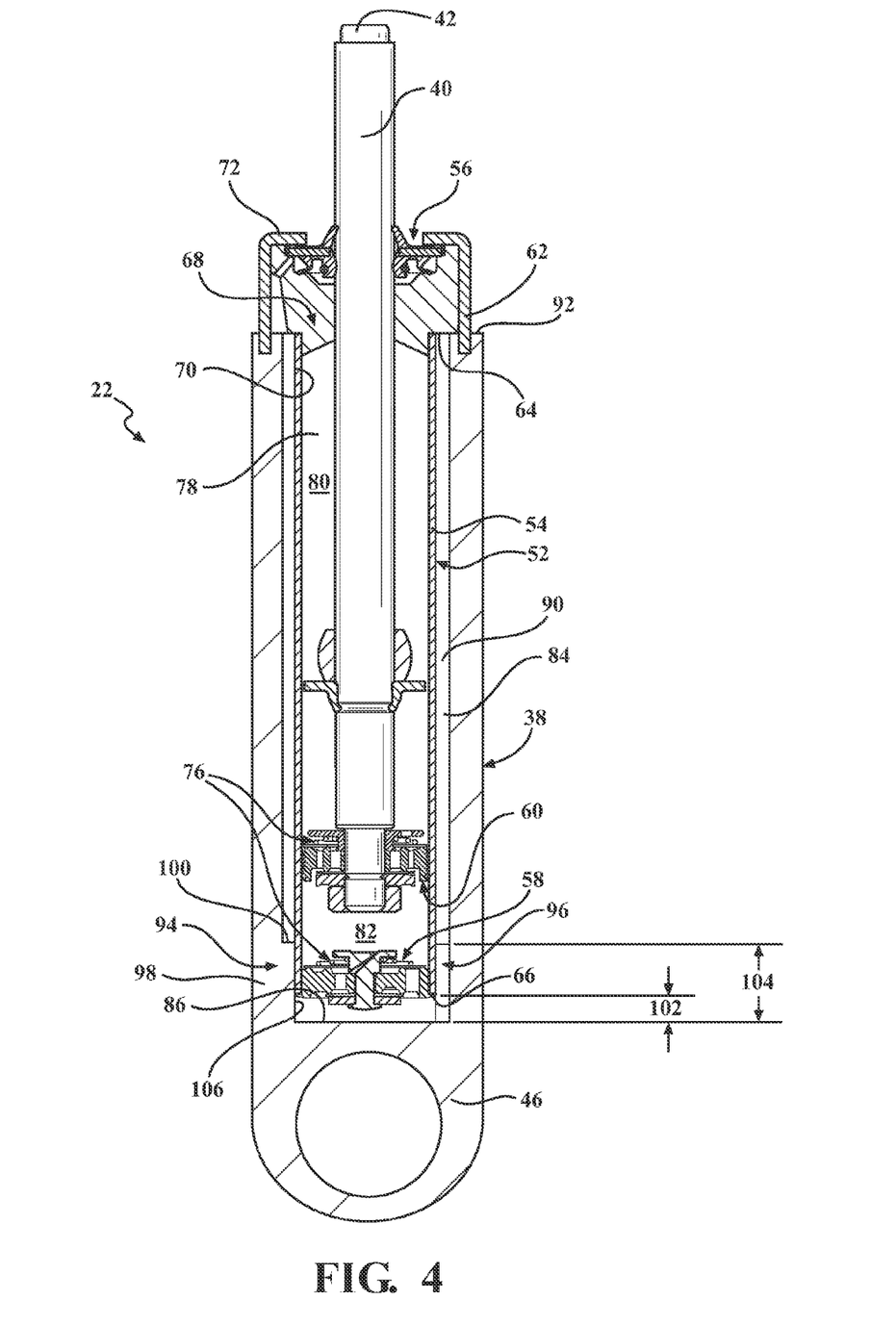
FIG. 4 is a sectional side view of a shock absorber having an inner assembly and a composite base assembly, according to another embodiment of the present invention.

Referring now to FIGS. 3A, 3B, and 4, various embodiments of the shock absorber 22 are shown. As will be appreciated from the discussion that follows, common reference will be made to the various components of the shock absorbers 22 shown in each of the FIGS. 3A, 3B, and 4 for the purposes of clarity and consistency. The shock absorber 22 of the present invention includes an inner assembly 52 and the composite base assembly 38. The inner assembly 52 and composite base assembly 38 cooperate as described in greater detail below to define, what is sometimes referred to in the related art as, a "double tube" shock absorber 22. The inner assembly 52 includes a pressure tube 54, a rod guide 56, a compression valve 58, a piston assembly 60, and the rod 40 discussed above. The composite base assembly 38 may further include a closure insert 62 operatively attached thereto for sealing and/or closing the composite base assembly 38. Each of the components introduced above will be described in greater detail below.

The pressure tube 54 of the inner assembly 52 extends between opposing first and second ends 64, 66. The rod guide 56 is disposed adjacent to the first end 64 of the pressure tube 54 and is used to concentrically align and constrain both the pressure tube 54 and the rod 40. The rod guide 56 typically defines a lower step 68 operatively engaging the first end 64 of the pressure tube 54. More specifically, the lower step 68 engages both an inside surface 70 of the pressure tube 54 as well as the first end 64 of the pressure tube 54. However, those having ordinary skill in the art will appreciate that the rod guide 56 could be formed, shaped, or otherwise configured in any suitable way without departing from the scope of the present invention. Further, the rod guide 56 helps seal the shock absorber 22 so as to prevent escape of fluid (not shown, but typically realized as a non-compressible oil) as well as to block contaminants and debris from entering. The rod guide 56 typically operatively engages to the closure insert 62 which, similarly, is operatively engaged to the composite base assembly 38 as described in greater detail below.

The closure insert 62 is typically concentrically aligned with the rod guide 56, is manufactured from a metal, and may be operatively engaged to the rod guide 56 in any suitable way. By way of non-limiting example, the closure insert 62 could be crimped to a slot 72 disposed in the rod guide 56 (see FIGS. 3A, 3B), or could be rolled (or "spun") onto a top surface 74 of the rod guide 56 (see FIG. 4) with the rod guide 56 also being axially supported by the composite base assembly 38, as described in U.S. Provisional Application No. 62/084,779, which is incorporated herein by reference. Nevertheless, it will be appreciated that the rod guide 56 can be configured to attach to the composite base assembly 38 or the closure insert 62 in any suitable way without departing from the scope of the present invention.

As noted above, the inner assembly 52 also includes the compression valve 58 disposed adjacent to the second end 66 of the pressure tube 54, and the piston assembly 60 disposed in the pressure tube 54 between the rod guide 56 and the compression valve 58, with the rod 40 operatively attached to the piston assembly 60 and supported by the rod guide 56. Both the piston assembly 60 and the compression valve 58 typically include valving, generally indicated at 76 in FIGS. 3A, 3B, and 4, to control the flow of fluid through internal passages (not shown in detail, but generally known in the art) in operation. To that end, the pressure tube 54 defines a working chamber 78 in which the piston assembly 60 travels. The piston assembly 60 separates the working chamber 78 into an upper working chamber 80 disposed between the rod guide 56 and the piston assembly 60, and a lower working chamber 82 disposed between the piston assembly 60 and the compression valve 58. The rod 40 extends through the upper working chamber 80, but not the lower working chamber 82, thereby creating a differential volume of fluid to be displaced as the piston assembly 60 travels within the pressure tube 54.

The pressure tube 54 of the inner assembly 52 is substantially disposed within the composite base assembly 38. To that end, the composite base assembly 38 defines a chamber 84 for at least partially accommodating the inner assembly 52 therein. The chamber 84 terminates at a floor 86. The second end 66 of the pressure tube 54 may be spaced from the floor 86 as shown in FIGS. 3A, 3B, and 4. In such embodiments, the compression valve 58 may be further secured into the second end 66 of the pressure tube 54 by a mechanical connection, such as welding or crimping, if needed. The chamber 84 is larger in diameter than the pressure tube 54 of the inner assembly 52, thereby defining a reservoir chamber 90 between the chamber 84 and the pressure tube 54. The reservoir chamber 90 is in fluid communication with the working chamber 78 of the pressure tube 54 and is adapted to store additional fluid necessitated by the differential volume of fluid caused by the presence of the rod 40 in the upper working chamber 80 of the pressure tube 54, as discussed above. While the chamber 84 of the composite base assembly 38 has a cylindrical profile, those having ordinary skill in the art will appreciate that the chamber 84 could have any suitable profile or shape, or be of any suitable size or configuration sufficient to at least partially accommodate the inner assembly 52, without departing from the scope of the present invention.

FIG. 3B shows another embodiment of the subject invention having the compression valve 58 in contact with the floor 86 and the second end 66 of the pressure tube 54 abutting the compression valve 58. The compression valve 58 includes a seal extension 59 that extends between the second end 66 of the pressure tube 54 and the floor 86. Typically, the compression valve 58 is press-fit into the pressure tube 54 and for all metal shock absorbers the press-fit engagement is adequate to secure the compression valve 58 into the pressure tube 54. In the subject invention, since the composite base assembly 38 elongates under applied forces, certain forces might be encountered that results in the compression valve 58 becoming dislodged from the pressure tube 54. The seal extension 59 ensures that, even if the composite base assembly 38 is elongated, the end 66 of the pressure tube 54 remains adjacent the seal extension. In other words, the seal extension 59 ensures that the compression valve 58 does not become dislodged or askew relative to the end 66 of the pressure tube 54. A portion of the seal extension 59 may have the same diameter as the pressure tube 54 and another portion that is sized to be press-fit into the pressure tube 54.

The composite base assembly 38 of the present invention supports the inner assembly 52 and is formed from a composite material. In the embodiments shown herein, the composite base assembly 38 is a unitary, one-piece component manufactured from a thermosetting fiber-filled polymer. More specifically, the thermoset material has glass filler strands approximately 1.5-3.0 CM in length. By way of non-limiting example, vinylester resin with 35 to 40% glass fiber may be used. However, those having ordinary skill in the art will appreciate that the composite base assembly 38 could be manufactured from any suitable composite material, using any suitable type or amount of reinforcing fiber or filler, using any suitable manufacturing process, without departing from the scope of the present invention. Similarly, it will be appreciated that the composite base assembly 38 could be manufactured as or from any suitable number of discrete or congruent merging components, structures, or features, operatively attached to each other in any suitable way, without departing from the scope of the present invention.

Those having ordinary skill in the art will appreciate that conventional composite materials of the kind used to manufacture the composite base assembly 38 typically have significantly different properties than those of the metals used to manufacture the components of the inner assembly 52. As one example, composite materials may have a higher coefficient of expansion than metals and may respond differently to changes in ambient or operating temperature. As another example, composite materials typically exhibit a lower elastic modulus, or Young's modulus. In other words, the composite material is less stiff than the metal and, as such, may elongate or stretch more than the metal. The composite base assembly 38 has an elastic modulus less than steel at 25° C. Preferably, the elastic modulus of the composite base assembly 38 is less than 75 GPa at 25° C. By way of non-limiting example, the elastic modulus of vinylester at room temperature is lower than steel (9.9 GPa vs 200 GPa). Thus, in operation, axial loading of the shock absorber 22 causes the composite base assembly 38 to flex more than the inner assembly 52. This tendency can be even more detrimental at higher operating temperatures. As such, the composite base assembly 38 needs to cooperate with the inner assembly 52 so as to prevent misalignment during operation given the different properties, particularly when the application involves high operating temperature or high load, where the composite material flexes or stretches substantially more than the metals.

In order to prevent misalignment between the inner assembly 52 and the composite base assembly 38, due in part to the difference in material properties, the composite base assembly 38 has a lower element 94 disposed adjacent to the floor 86. The lower element 94 at least partially engages the second end 66 of the pressure tube 54 of the inner assembly 52. Preferably, the height of lower element 94 is larger than the maximum elongation achieved by the composite base assembly 38. More preferably, the height of the lower element 94 will be greater than the maximum elongation achieved by the composite base assembly 38 in any conditions the vehicle would encounter. The lower element 94 further defines at least one gap 96 for facilitating fluid communication between the pressure tube 54 and the chamber 84. More specifically, the gap 96 allows fluid to flow from the lower working chamber 82 of the pressure tube 54, via the compression valve 58, to the reservoir chamber 90 discussed above.

Figure 5:
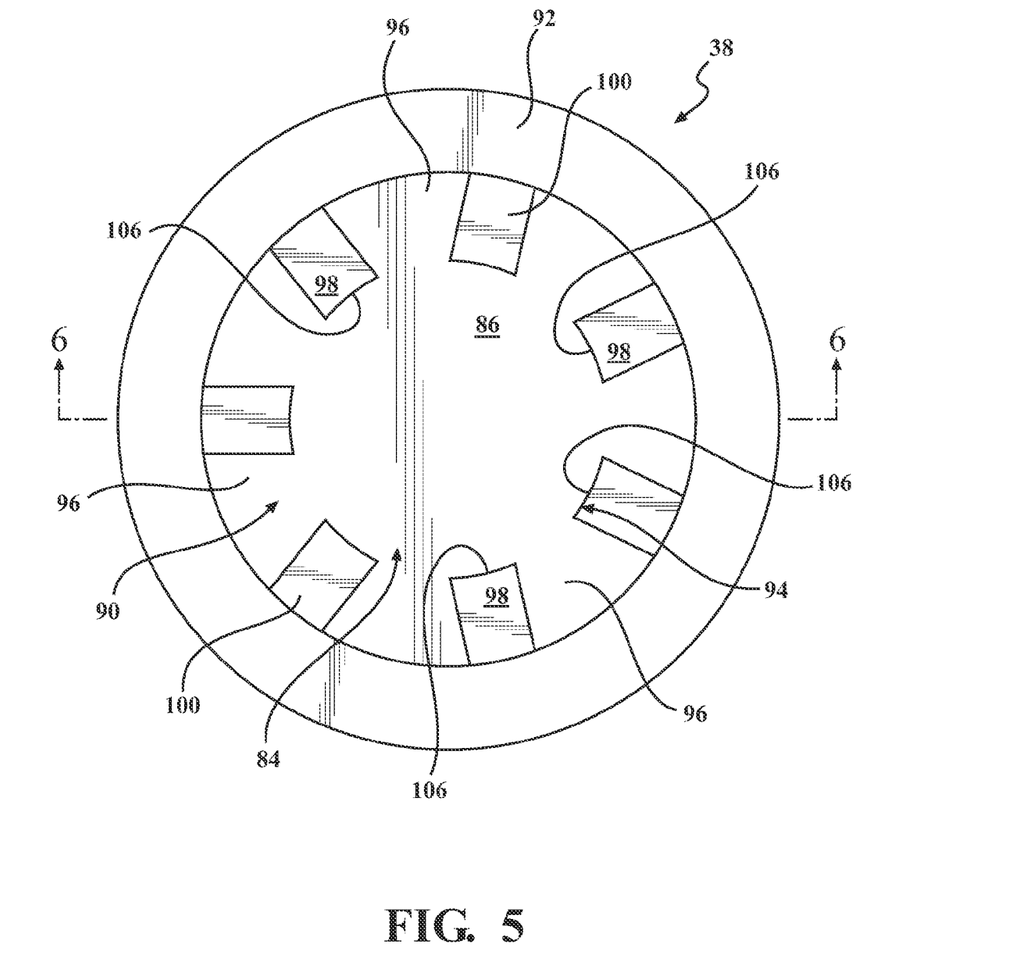
FIG. 5 is an enlarged top plan view of the composite base assembly of FIGS. 3 and 4.
Figure 6:
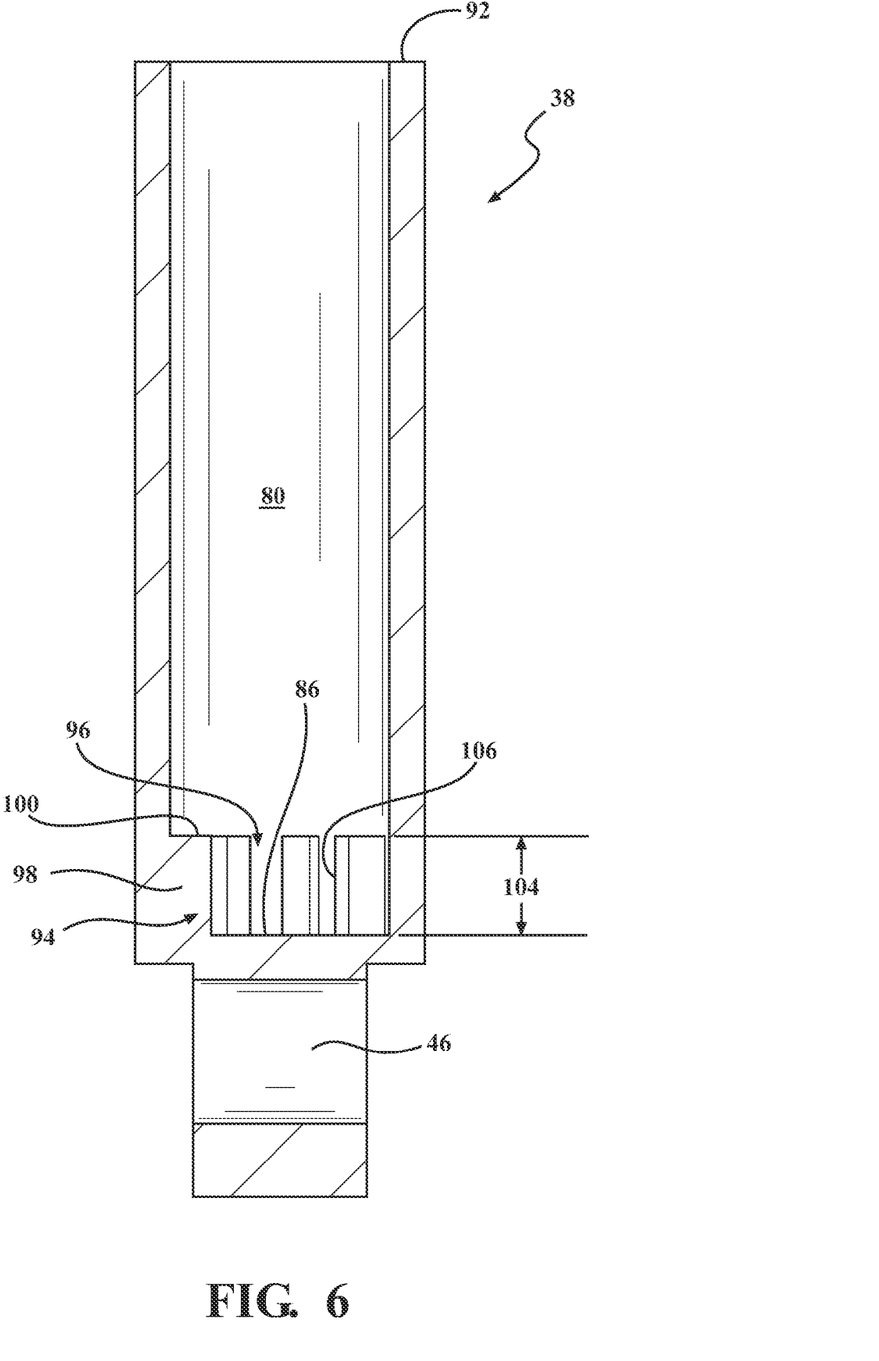
FIG. 6 is a sectional view taken along line 6-6 of FIG. 5.
Figure 7:
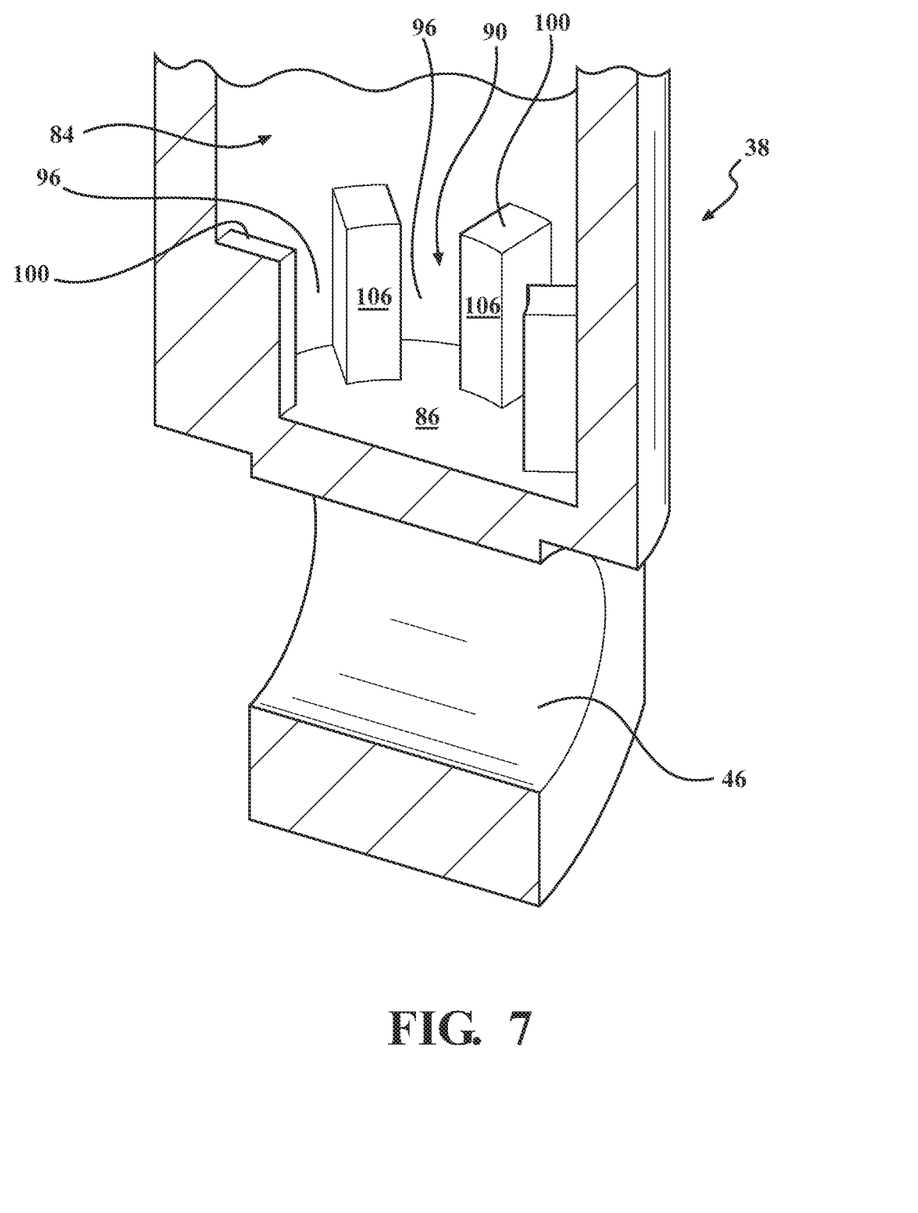
FIG. 7 is a rotated partial perspective sectional view of the composite base assembly of FIGS. 5 and 6.

Referring to FIGS. 5-7, the lower element 94 is shown as being formed as a plurality of radially-spaced retainers 98 with gaps 96 defined therebetween. However, those having ordinary skill in the art will appreciate that any suitable number of retainers 98 or gaps 96 could be utilized without departing from the scope of the present invention. The retainers 98 may be integrally formed with the composite base assembly 38. The retainers 98 extend from the floor 86 of the chamber 84 of the composite base assembly 38 to an upper end 100. In a static position, the second end 66 of the pressure tube 54 is disposed between the floor 86 of the chamber 84 and the upper end 100 of the lower elements 98.

Returning back to FIGS. 3A and 4, the second end 66 of the pressure tube 54 is spaced a first distance 102 from the floor 86 of the composite base assembly 38, whereas FIG. 3B shows the compression valve 58 in contact with the floor 86. With reference to FIG. 4, the retainers 98 extend a second distance 104 from the floor 86 and the upper end 100. The second distance 104 is greater than the first distance 102 such that any elongation of the composite base assembly 38 will not allow the second end 66 of the pressure tube 54 to become dislodged from the lower element 94. The second distance 104 may be 2×-3× greater than the first distance 102. With reference to the embodiment shown in FIG. 3B, the first distance 102 may be consumed by the seal extension 59 to ensure that the compression valve 58 does not dislodge from the pressure tube 54.

Referring again to FIGS. 5-7, the retainers 98 have curved inside edges 106 that help provide radial support and stability to the pressure tube 54 adjacent to the second end 66. However, those having ordinary skill in the art will appreciate that the retainers 98 could have any suitable shape or could be of any suitable configuration without departing from the scope of the present invention.

In operation, the lower element 94 of the composite base assembly 38 of the present invention radially engages the second end 66 of the pressure tube 54 and, at the same time, compensates for the flexibility or elongation differential discussed above by allowing the inner assembly 52 to translate axially without becoming free of the lower element 94. More specifically, the second end 66 of the pressure tube 54 is radially supported by the curved inside edges 106 of the lower elements 98 such that misalignment between the inner assembly 52 and the composite base assembly 38 is prevented; and, at the same time, the pressure tube 54 can translate axially within the chamber 84 in response to flexing of the composite base assembly 38 due to heat and/or load, such that the second end 66 of the pressure tube 54 remains between the floor 86 of the composite base assembly 38 and the upper end 100 of the lower elements 98. Said differently, the lower element 94 traps said second end and restricts lateral movement thereof, while permitting longitudinal movement.

The various components of the shock absorber 22 of the present invention cooperate to effectively dampen axial movement in operation. Further, the shock absorber 22 of the present invention significantly reduces the weight of suspension systems 14, in that light-weight composite materials can be used to manufacture shock absorbers 22 that have improved reliability, performance, and functionality.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A shock absorber comprising:
    an inner assembly including:
        a pressure tube extending between first and second ends,
        a rod guide disposed adjacent to said first end of said pressure tube,
        a compression valve disposed adjacent to said second end of said pressure tube,
        a piston assembly disposed in said pressure tube between said rod guide and said compression valve, and
        a rod operatively attached to said piston assembly and supported by said rod guide so as to concentrically align said rod with said pressure tube; and
    a composite base assembly formed of a composite material and said pressure tube formed of a metal material, such that the composite base assembly has a lower elastic modulus than said pressure tube;
    said composite base assembly comprising a floor and at least one wall extending from said floor, with said floor and said at least one wall defining a chamber for at least partially accommodating said inner assembly therein, wherein said floor and said wall are integrally formed with one another of said composite material;
    said composite base assembly having a lower element integrally formed with said floor and said wall of said composite material; and
    said lower element extending from said floor to an upper end and extending inwardly from said wall, said second end of said pressure tube and said compression valve being disposed between said floor and said upper end such that said lower element traps said second end of said pressure tube of said inner assembly and said compression valve to restrict lateral movement thereof, while permitting longitudinal movement of said second end and said compression valve between said floor and said upper end without dislodging from said lower element, said lower element defining at least one gap for facilitating fluid communication between said pressure tube and said chamber.

2. The shock absorber as set forth in claim 1, wherein said lower element is further defined as a plurality of radially-spaced retainers, said retainers defining a plurality of corresponding radially-spaced gaps therebetween.

3. The shock absorber as set forth in claim 1, wherein said lower element includes a curved inside edge for radially supporting said second end of said pressure tube.

4. The shock absorber as set forth in claim 1, wherein said second end of said pressure tube and said floor of said composite base assembly define a first distance therebetween and said upper end of said lower element and said floor of said composite base assembly define a second distance therebetween, and wherein said second distance is larger than said first distance.

5. The shock absorber as set forth in claim 4, wherein said second distance is as least twice as large as said first distance.

6. The shock absorber as set forth in claim 1, wherein said compression valve further includes a seal extension extending between said second end of said pressure tube and said floor of said composite base assembly.

7. The shock absorber as set forth in claim 6, wherein said compression valve is press-fit into said pressure tube and includes a first portion having a first diameter the same as an inner diameter of said pressure tube and a second portion having a second diameter the same as an outer diameter of said pressure tube.

8. The shock absorber as set forth in claim 1, wherein said lower element includes a curved inside edge for radially supporting said second end of said pressure tube.

\* \* \* \* \*